March 3, 1964
J. J. CASEY ETAL
3,123,464
METHOD OF PRODUCING TITANIUM
Filed Dec. 15, 1954
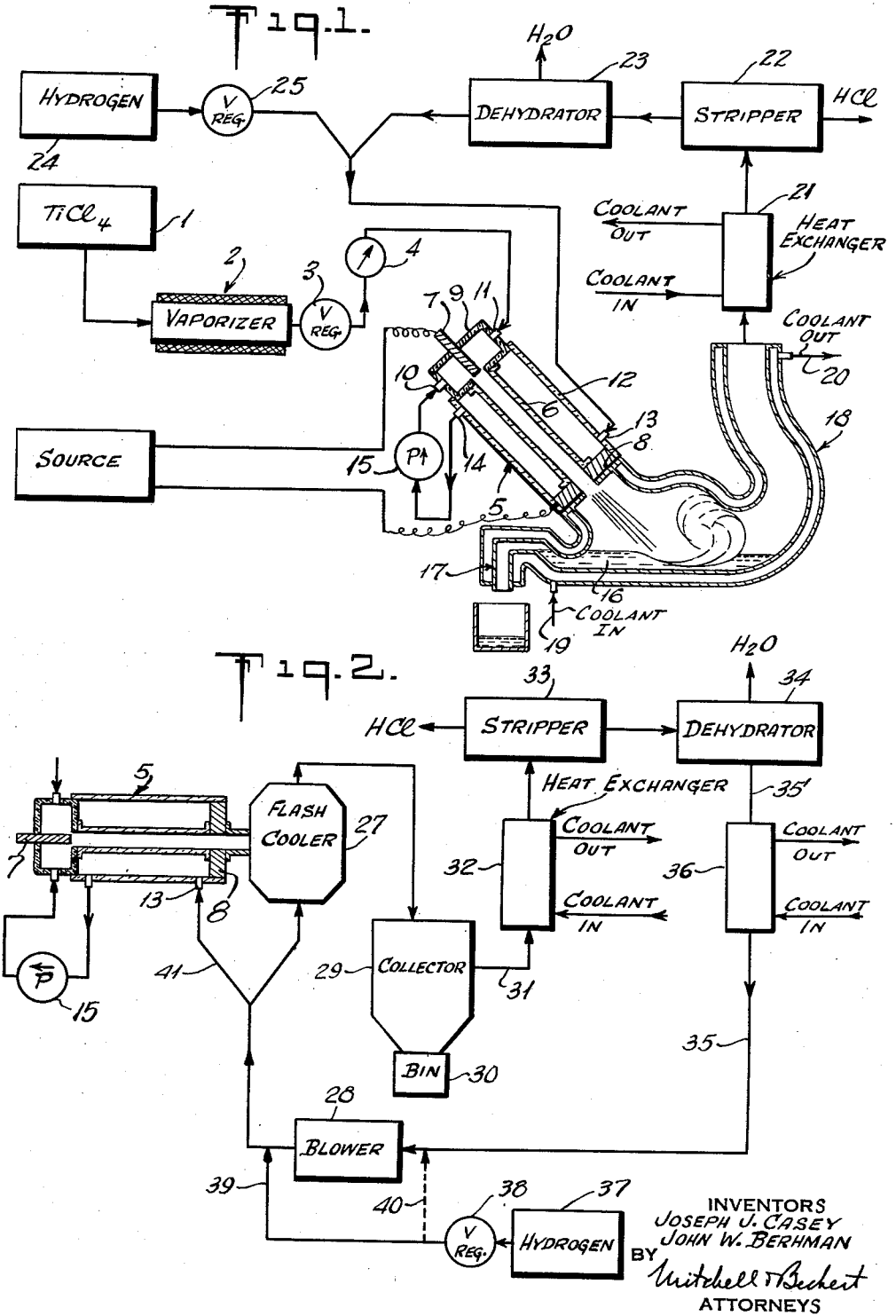
INVENTORS
JOSEPH J. CASEY
JOHN W. BERHMAN
BY
Mitchell & Bechert
ATTORNEYS

3,123,464
METHOD OF PRODUCING TITANIUM
Joseph J. Casey, Shelbyville, Tenn., and John W. Berhman, Pompton Plains, N.J., assignors to Amalgamated Growth Industries, Inc., New York, N.Y., a corporation of Delaware
Filed Dec. 15, 1954, Ser. No. 475,532
9 Claims. (Cl. 75—10)

Our invention relates to a method and apparatus for preparation of metallic titanium.

In the preparation of the high-melting, relatively electro-positive metals, such as titanium, it is industrial practice to depend upon the replacement of the metal halides (usually the chloride) by more reactive metals, such as sodium or magnesium, in the liquid state. Since the boiling points of sodium and magnesium are appreciably below the melting point of titanium, this latter metal is formed without fusion into a porous mass, usually referred to as "sponge." Untill by satisfactory means, such as leaching or volatilization, the excess reducing metal (together with by-product salts) is removed, the sponge may not further be processed into desirable ingot form of acceptable purity. These practices therefore are necessarily cumbersome, and must bear the appreciable cost of the reducing metals used (to the extent of their reduction in value to the halide); furthermore, these processes do not readily lend themselves to efficient continuous-process techniques.

The use of hydrogen as a suitable reducing agent for titanium chloride would have obvious advantages, particularly if employed at temperatures in excess of the melting point of titanium. The reaction, (1)   $TiCl_4 + 2H_2 \rightarrow Ti^0 + 4HCl$ (gas)

would result, at those temperatures (e.g., >1690° C.), in a readily cast, molten-metal product, and in a non-condensing gas. However, it has been generally considered that hydrogen cannot thus be employed as a reducing agent because:

(a) Related to room temperature, the reaction is endothermic, i.e. impelled to proceed in the reverse direction;

(b) Titanium has a high affinity for hydrogen, which is, in many applications, an undesirable contaminant; and (c) The other components, HCl and $Cl_2$, have a strong tendency to attack titanium.

We have found that those objections can be overcome. Our invention has as its purpose, therefore, the provision of a method and apparatus for preparation of metallic titanium by the reduction of titanium chlorides with hydrogen.

It is another purpose of our invention to provide a method and apparatus for the preparation of metallic titanium by the reduction of its chlorides with atomic hydrogen.

It is a specific purpose of our invention to provide a method and apparatus for the more direct preparation of molten and ingot (or pig) titanium by condensing its vapors.

It is another specific purpose of our invention to provide a method and apparatus for the preparation of powdered titanium by flash-cooling of its vapors.

It is a general purpose of our invention to achieve the above purposes on a continuous-production basis, and with a metallic-titanium end product of superior purity.

Considering first the preparation of liquid titanium, it is fundamental to our method that the constituents of the reaction ($TiCl_4$ and $H_2$) be heated to a temperature at least to, and preferably in excess of, the metal-boiling point (approximately 3535° C.) for titanium. Of the original components, $TiCl_4$ and $H_2$, hydrogen is preferably present with an appreciable excess over that required for the theoretical reaction (1). At temperatures of 3535° C. or more, we believe the following factors become significant in the behavior of the three-component system Cl—Ti—H:

(a) In the equilibrium $H_2 + Cl_2 \leftrightarrow 2HCl$ (by itself), the dissociation of HCl is only about 10 percent, or, conversely, HCl is substantially 90 percent associated;

(b) The equilibrium $Ti + X/2 Cl_2 \leftrightarrow TiCl_x$ (by itself) is is not known, due to insufficient data, but we consider that $TiCl_x$ has a heat of formation much less than that of $TiCl_4$;

(c) The equilibrium $H_2 \leftrightarrow H^0 + H^0$ is one of more than 50 percent dissociation at atmospheric pressure (the reaction, reading from left to right, is endothermic to the extent of approximately 98 kg.-calories/mol $H_2$);

(d) The tendency of $H_2$ to dissolve in or react with Ti is insignificant.

With the above postulations, it will be recognized that, with excess hydrogen present, the capture of $Cl_2$ by hydrogen will be favored. It will further be recognized that by condensing Ti at temperatures of the order of 3000° C. (at which temperatures no other element or compound present can condense) any tendency to form $TiCl_x$ will be reversed. Perhaps of most significance is the fact that, since the hydrogen present (in excess) is more than 50 percent dissociated to $H^0$, the reaction (related to room temperature) tends to become, not (1)   $TiCl_4 + 2H_2 \rightarrow Ti^0 + 4HCl$
$\Delta H - 179 + 0 = 0 - 88$
$\Delta H = +91$ kg.-cal./mol meaning that 91 kg.-cal./mol are required by the reaction, but rather (2)   $TiCl_4 + 4H^0 \rightarrow Ti^0 + 4HCl$
$\Delta H - 179 + 196 = 0 - 88$
$\therefore \Delta H = 105$ kg.-cal./mol meaning that 105 kg.-cal./mol are produced by the reaction. In other words, due to the presence of highly reactive atomic hydrogen, the reaction becomes exothermic, not endothermic, and can thus proceed in accordance with thermodynamic expectations.

The method for attaining the desired very high temperature depends upon proper use of the electric arc. The arc can be made to produce atomic hydrogen, and the recombination of atomic hydrogen into molecules (i.e. $H_2$ or HCl) provides a secondary heat release capable of exceeding normal arc (i.e. carbon-arc) temperatures. It is a requirement of the arc that it heat the components under continuous-flow conditions to a temperature which, as retained by the subsequent reactions of atomic hydrogen, will establish (in a chamber subsequent to the arc reactor) a zone of temperature in excess of the condensing temperature of titanium. In one embodiment of the invention, such chamber is utilized as a condenser (as by proper cooling of its walls and by agitation of condensed metal), and molten titanium may be continuously cast therefrom. Although any suitable arc reactor may be employed, we have found a most satisfactory heat source in the so-called Rava electric-arc torch, as described for example in copending application, Serial No. 457,403, filed September 21, 1954, now Patent No. 2,769,079, granted October 30, 1956, in the name of Rufus L. Briggs.

It is a significant characteristic of our method and apparatus that additional energy may be added to the system before, within, or after the arc device, and that such energy will (a) contribute to the thermal effect desired, and/or (b) be selectively absorbed (as by Ti) to influence such equilibria as described above, and/or (c) contribute to the efficiency of separation of the end-products. As an example of one such application, passage of the constituents through a D.-C. arc subsequent to molecular breakdown imparts to the Ti (in the instant case) an increased charge which may greatly abet its separation under an electrostatic or magnetic influence.

In the drawings, which show, for illustrative purposes only, preferred forms and methods of the invention:

FIG. 1 is a diagram illustrating a process for producing titanium pig; and

FIG. 2 is a fragmentary diagram illustrating modification of FIG. 1 in a process for producing titanium powder.

In FIG. 1, the raw material $TiCl_4$ (in liquid form) is fed from a storage container 1 to a vaporizer 2, where it is heated by any suitable means and converted to a vapor. The vapor is then fed through a flow-control device 3 (and, if desired, flow indicator 4) to a Rava torch 5, of the elongated-arc variety. As more fully described in said copending Briggs patent application, the torch 5 provides a means for establishing an elongated continuous electric arc, within a chamber 6, and extending between an upstream electrode 7 and an annular downstream electrode 8; gas-supply manifolding means 9 may have one or more inlet ports 10—11 for accommodation of reactants, discharged into chamber 6 at the upstream electrode, and continuously blown down the length of the arc. In the arrangement shown, a jacket 12 surrounds the arc chamber 6 and provides a means whereby hydrogen gas, entering at port 13 and leaving at port 14, may be pre-heated prior to pressurizing (by means 15) for direct feeding at port 10 into the upstream end of the torch 5. The vaporized $TiCl_4$ should enter the torch at a location sufficiently upstream to permit heating to at least a temperature of the order of 3500° C. and is shown entering the torch at port 11, where it may be allowed to mix with excess hydrogen in manifolding means 9.

The mixed reactants, $TiCl_4$ and $H_2$, remain in the flow stream and in the arc for the length of the torch and may thus be heated at least to substantially the boiling point of titanium metal, before discharge from the torch 5 and into the condenser 18. Condenser 18 is shown to have jacketed walls of a suitable metal (e.g., steel) cooled by any desirable coolant, such as water, which enters the jacket through inlet 19 and leaves through outlet 20. Within the condenser, the titanium metal condenses on the walls and, due to the heat transfer induced by the coolant, cools further to the solid state. The condenser then becomes lined with solid titanium which builds up until the heat input and the heat loss reach equilibrium; at equilibrium, the condensing titanium vapors are no longer cooled to the solid state, and liquid titanium is accumulated in a pool 16 at the bottom of the condenser, to a level determined by a trap 17. The torch continuously discharges into the pool 16 to develop a continuous spray or wall of liquid titanium, as suggested by turbulent eddies sketched on the drawing, and blocking the escape of titanium through the gas outlet of the condenser. Titanium metal will spill out the trap 17 for collection, as by casting pig directly.

After condensation, the remaining gas stream consists of hydrogen and hydrogen chloride and may leave the condenser 18 in a generally upward direction, for further cooling by a heat exchanger 21. The cooled gases may then proceed to a stripper 22, for removing the HCl from the hydrogen by conventional physical or chemical means (e.g., $Na_2O$, or $CaO$). If water is a by-product of the stripping method, the wet hydrogen may be fed to a dehydrator 23 (e.g., silica gel) for drying. The clean hydrogen stream is then reinforced by fresh hydrogen, equivalent to that removed in the process, and originating from source or storage vessel 24 through regulator 25. The combined hydrogen streams are then fed to the jacket 12 of the Rava torch, where they gain heat while serving the useful function of cooling the torch. The hydrogen is drawn from the jacket to pump 15, which feeds it to the torch 5 and provides the necessary recirculatory force for the process.

The production of titanium powder may be analogous to the described method of producing titanium pig, the principal difference being that, since true fluid condensation is not needed, the maximum temperatures in the system need only be sufficient to promote the reaction and, depending on the hydrogen ratio employed, may actually be less than the boiling point of titanium, though not appreciably so. For powder production, there is required quick-chilling of the stream leaving the torch; this may be achieved by a cold stream of suitable gas which may be inert (such as helium or argon) or which may be and preferably is of hydrogen. Alternatively, quick-chilling may be achieved by direct impingement on a chilled surface, as on the periphery of a rotating drum. By quick-chilling, even though the titanium is brought through a highly-reactive temperature zone, the time involved can be of such short duration that appreciable recombination is avoided. In FIG. 2, we have illustrated the chilling operation as performed with hydrogen, whereby recirculation can be employed after conventional use of powder-collector and gas-cooler (heat-exchanger) devices. The powdered product, which is extremely fine, will have absorbed or adsorbed appreciable amounts of hydrogen; this, however, can be removed in subsequent sintering or casting, by methods involving heat and/or vacuum, such methods being of common knowledge to those skilled in the art.

To illustrate the method and apparatus for producing powdered titanium, FIG. 2 shows that, in place of condenser 18, we substitute a flash-cooler 27, which may be fed by a blower 28 handling cold hydrogen, and again supplying the same in excessive quantity. The outlet of the flash-cooler leads to a collector 29, where the powdered titanium may be collected and continuously or periodically dropped into a bin 30; having collected the titanium powder, collector 29 will discharge, in line 31, a continuous stream of $H_2$ and HCl, which can be cooled, stripped, and dehydrated at 32—33—34 in the manner described for FIG. 1, for return in line 35 to blower 28 as fully reprocessed $H_2$. If desired, another heat exchanger 36 in line 35 may further cool the reprocessed $H_2$. Make-up hydrogen may be fed from a source 37 and regulator 38 to the blower system on either the upstream or downstream ends of the blower, as suggested by the solid line 39 and dashed line 40. Although not specifically shown in FIG. 2, it will be understood that hydrogen to feed the torch 5 may be drawn from the reprocessed-$H_2$ line 35' (between the dehydrator 34 and heat exchanger 36); such connection could be made direct to the torch-jacket inlet 13 without requiring additional $H_2$ make-up or reinforcement supply. Alternatively, a branch line 41 may directly connect make-up and reprocessed hydrogen to the jacket inlet 13, as shown in FIG. 2.

It will be seen that we have described ingenious means and methods whereby metallic titanium may be produced directly and on a continuous basis. Because the method relies for its operation on an excessive supply of hydrogen, much of it in the highly reactive atomic state, the reaction favors formation of hydrogen chloride (rather than recombination to titanium chloride), and pure titanium is yielded. In producing molten titanium or titanium pig with our method, all undesirable products are gaseous, and therefore the condensate is highly refined pure titanium. Thus, titanium pig is achievable directly and without any intermediate step, such as one involving production of titanium sponge. Our processes lend themselves to reclamation of the hydrogen, which must be provided in excess, and because the system involves recirculation, it may be run closed, thus assuring safety of operations. The principal energy required to conduct our process with the means described involves electrical supply to the torch and this, of course, must be sufficient to establish the temperature regimes described above; however, once these temperature regimes are established, the overall desired reactions are exothermic, and stability is thus promoted so as to serve the purpose of continuous production.

While we have described our invention for preferred methods and apparatus, it will be understood that modifications may be made without departing from the scope of the invention as defined in the claims which follow.

We claim:

1. The method of producing titanium, which comprises vaporizing titanium chloride, mixing said vapor with a flow of hydrogen in a proportion exceeding that required to react with all the available chlorine in the titanium chloride, subjecting the mixed flow to a temperature above the boiling point of titanium, in an elongated electric-arc discharging generally along the direction of said flow whereby the excess hydrogen may scavenge the available chlorine, and rapidly cooling the flow products substantially immediately on leaving said arc to recover metallic titanium whereby reversal of the reaction is prevented.

2. The method of producing titanium pig, which comprises vaporizing titanium chloride, mixing said vapor with a flow of hydrogen in a proportion exceeding that required to react with all the available chlorine in the titanium chloride, subjecting the mixed flow to a temperature of at least 3535° C., whereby the excess hydrogen may scavenge the available chlorine, condensing the titanium into the liquid state over a condensing surface of extended area at a temperature above the condensing temperatures of the substances present, and collecting the condensed metal.

3. The method of continuously producing titanium, which comprises mixing titanium chloride with a flow of hydrogen in a proportion exceeding that required to react with all the available chlorine in the titanium chloride, subjecting the mixed flow to a temperature above the boiling point of titanium in an elongated electric-arc reaction zone, rapidly removing the metallic titanium from the reaction zone by cooling to prevent reversal of the reaction whereby hydrogen and hydrogen chloride remain as gaseous products, collecting said products, stripping said products of hydrogen chloride, whereby reprocessed hydrogen is available, and recirculating said reprocessed hydrogen by mixing the same with the titanium chloride.

4. The method of claim 3, and including the additional step of dehydrating the reprocessed hydrogen prior to recirculation.

5. The method of producing titanium, which comprises mixing titanium chloride with a flow of hydrogen in a proportion exceeding that required to react with all the available chlorine, subjecting the mixed flow to a temperature above the boiling point of titanium for a substantial flow-path length at said temperature, whereby atomic hydrogen may be developed in substantial proportions for combination with chlorine dissociated from the titanium chloride, removing the hydrogen and hydrogen chloride, and cooling to recover metallic titanium.

6. The method of producing titanium, which comprises vaporizing titanium chloride, mixing said vapor with a strong flow of hydrogen exceeding that required to react with all the available chlorine in the titanium chloride, subjecting the mixed flow to a temperature above the boiling point of titanium for a length of time permitting the excess hydrogen to scavenge the available chlorine, and directing a continuous blast of the heated products directly into a pool of liquid titanium.

7. The method of producing titanium, which comprises vaporizing titanium chloride, mixing said vapor with a strong flow of hydrogen exceeding that required to react with all the available chlorine in the titanium chloride, subjecting the mixed flow to a temperature above the boiling point of titanium for a length of time permitting the excess hydrogen to scavenge the available chlorine, and directing a continuous flow of the heated products directly into a turbulent volume of splashed liquid titanium.

8. The method of producing titanium metal, which comprises mixing titanium chloride with excess hydrogen, establishing a confined flow of said mixture, striking an elongated electric arc in the direction and over a sufficient length of said flow to elevate said mixture at least to a temperature above the boiling point of titanium, whereby reduction of titanium metal will occur, and quick-chilling the flow products substantially at the downstream end of said arc.

9. The method of producing metallic titanium, which comprises establishing an elongated continuous-flow reaction zone in which a continuous flow of hydrogen is dissociated into atomic hydrogen at least to the extent of substantially fifty percent, introducing titanium chloride into said zone, said hydrogen being supplied at a rate in excess of that required to combine with the available chlorine, whereby formation of hydrogen chloride is favored, subjecting said reactants to a temperature above the boiling point of titanium and quick-chilling the products of said zone before substantial opportunity is afforded for reversal of the process, whereby titanium metal may be extracted.

References Cited in the file of this patent

UNITED STATES PATENTS

| | | |
|---|---|---|
| 1,046,043 | Weintraub | Dec. 3, 1912 |
| 1,072,945 | Hayden | Sept. 9, 1913 |
| 1,173,012 | Meyer et al. | Feb. 22, 1916 |
| 1,193,783 | Hillhouse | Aug. 8, 1916 |
| 1,715,155 | Westberg | May 28, 1929 |
| 2,070,236 | Mullen | Feb. 9, 1937 |
| 2,113,058 | Mullen | Apr. 5, 1938 |
| 2,556,763 | Maddex | June 12, 1951 |
| 2,564,337 | Maddex | Aug. 14, 1951 |
| 2,708,158 | Smith | May 10, 1955 |
| 2,711,368 | Lewis | June 21, 1955 |
| 2,711,955 | Jordan | June 28, 1955 |
| 2,768,074 | Stauffer | Oct. 23, 1956 |
| 2,860,094 | Ishizuka | Nov. 11, 1958 |

FOREIGN PATENTS

| | | |
|---|---|---|
| 494,230 | Canada | July 7, 1953 |
| 296,867 | Germany | Mar. 13, 1917 |
| 393,092 | Great Britain | June 1, 1933 |
| 504,048 | Great Britain | Apr. 19, 1939 |
| 1,088,006 | France | Sept. 1, 1954 |